United States Patent
Kim

(10) Patent No.: US 10,528,264 B2
(45) Date of Patent: Jan. 7, 2020

(54) STORAGE DEVICE AND DATA PROCESSING SYSTEM INCLUDING THE SAME

(71) Applicant: SAMSUNG ELECTRONICS CO., LTD., Suwon-si (KR)

(72) Inventor: Dong Woo Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 85 days.

(21) Appl. No.: 15/475,506

(22) Filed: Mar. 31, 2017

(65) Prior Publication Data
US 2018/0129416 A1 May 10, 2018

(30) Foreign Application Priority Data
Nov. 4, 2016 (KR) .................. 10-2016-0146838

(51) Int. Cl.
*G06F 3/06* (2006.01)
*G06F 12/0866* (2016.01)
*G06F 13/14* (2006.01)
*G06F 11/14* (2006.01)

(52) U.S. Cl.
CPC .......... *G06F 3/061* (2013.01); *G06F 3/065* (2013.01); *G06F 3/0619* (2013.01); *G06F 3/0679* (2013.01); *G06F 11/1441* (2013.01); *G06F 12/0866* (2013.01); *G06F 13/14* (2013.01); *G06F 2212/1032* (2013.01); *G06F 2212/2146* (2013.01)

(58) Field of Classification Search
USPC ........................................... 711/102
See application file for complete search history.

(56) References Cited

U.S. PATENT DOCUMENTS

| 5,737,744 A * | 4/1998 | Callison .............. G06F 11/1076 711/114 |
| 5,798,961 A * | 8/1998 | Heyden .................. H02J 9/061 365/212 |
| 7,818,477 B2 * | 10/2010 | Toyama .................. G06F 3/061 710/52 |
| 8,806,271 B2 | 8/2014 | Yong et al. |
| 8,847,546 B2 | 9/2014 | Baarman et al. |
| 9,269,438 B2 | 2/2016 | Nachimuthu et al. |

(Continued)

FOREIGN PATENT DOCUMENTS

| JP | 5338905 B2 | 11/2013 |
| KR | 10-0777443 B1 | 11/2007 |

(Continued)

*Primary Examiner* — Mano Padmanabhan
*Assistant Examiner* — Jean C Edouard
(74) *Attorney, Agent, or Firm* — Sughrue Mion, PLLC

(57) ABSTRACT

A data processing system and method are disclosed. The data processing system may include a host, a storage device, and a battery supplying a power to the host and the storage device. The storage device may include a memory storing data received from the host, a cache temporarily storing the data, and a controller controlling the memory and the cache. The controller may be configured to receive a detachability attribute of the battery from the host, and determine, based on the detachability attribute of the battery, whether to perform a backup operation of the data in response to receiving a write command from the host.

17 Claims, 11 Drawing Sheets

(56) References Cited

U.S. PATENT DOCUMENTS

| | | | |
|---|---|---|---|
| 2004/0128448 A1 | 7/2004 | Stark et al. | |
| 2005/0075768 A1* | 4/2005 | Nicholson | G06F 1/263 701/31.4 |
| 2005/0124331 A1* | 6/2005 | Munje | G06F 1/30 455/418 |
| 2008/0104344 A1* | 5/2008 | Shimozono | G06F 11/1441 711/162 |
| 2010/0299565 A1* | 11/2010 | Muro | G06F 11/1004 714/54 |
| 2011/0016260 A1* | 1/2011 | Lomelino | G06F 11/1441 711/103 |
| 2011/0208914 A1* | 8/2011 | Winokur | G06F 11/1441 711/119 |
| 2011/0225345 A1* | 9/2011 | Inoue | G06F 3/0619 711/103 |
| 2011/0302352 A1* | 12/2011 | Lee | G11C 11/5628 711/102 |
| 2012/0017033 A1* | 1/2012 | Moritoki | G06F 11/1441 711/103 |
| 2012/0047387 A1 | 2/2012 | Sakata | |
| 2012/0089796 A1* | 4/2012 | Fukazawa | G06F 11/1441 711/162 |
| 2012/0166731 A1 | 6/2012 | Maciocco et al. | |
| 2012/0239852 A1* | 9/2012 | Calvert | G06F 11/1441 711/103 |
| 2013/0097458 A1* | 4/2013 | Sekino | G06F 11/1441 714/6.3 |
| 2014/0006834 A1* | 1/2014 | Ishii | G06F 1/30 713/340 |
| 2014/0173233 A1* | 6/2014 | Higashiyama | G06F 11/1441 711/162 |
| 2015/0026516 A1 | 1/2015 | Yong et al. | |
| 2015/0193299 A1* | 7/2015 | Hyun | G11C 29/52 714/6.24 |
| 2015/0268711 A1 | 9/2015 | Ramani et al. | |
| 2016/0070336 A1* | 3/2016 | Kojima | G06F 12/0246 711/103 |
| 2016/0085674 A1 | 3/2016 | Sterns et al. | |
| 2016/0335011 A1* | 11/2016 | Lee | G06F 3/0619 |

FOREIGN PATENT DOCUMENTS

| | | |
|---|---|---|
| KR | 10-1506675 B1 | 3/2015 |
| KR | 10-1636634 B1 | 7/2016 |
| WO | 2010/137164 A1 | 12/2010 |
| WO | 2013/095437 A1 | 6/2013 |

* cited by examiner

STORAGE DEVICE AND DATA PROCESSING SYSTEM INCLUDING THE SAME

This application claims priority from Korean Patent Application No. 10-2016-0146838, filed on Nov. 4, 2016, in the Korean Intellectual Property Office, the disclosure of which is incorporated herein by reference in its entirety.

BACKGROUND

1. Field of the Invention

Apparatuses and methods consistent with exemplary embodiments relate to a storage device and a data processing system including the same.

2. Description of the Related Art

Recently, non-volatile memory-based storage devices have become increasingly popular among consumers. For example, MP3 players, digital cameras, mobile phones, camcorders, flash cards, solid-state drives (SSD), and the like have increasingly adopted non-volatile memory as storage.

As the number of devices using non-volatile memory as storage has increased, the capacity of non-volatile memory has also risen rapidly. One of the methods of increasing memory capacity is a multi-level cell (MLC) method in which a plurality of bits are stored in one memory cell.

For example, in the case of a multi-level cell (MLC) in which multi-bit data is stored in one memory cell, the least significant bit (LSB) and the most significant bit (MSB), that is, two kinds of bit data may be programmed in one memory cell.

Thus, in the process of programming the MSB in a memory cell where the LSB is also programmed, errors may occur due to an unexpected program fail. In order to prevent the occurrence of errors and ensure the integrity of a storage device, a sudden power off recovery (SPOR) method of performing the backup of the LSB or periodically synchronizing the data temporarily stored in a cache may be used.

Meanwhile, a storage device may perform hibernation to operate in a sleep mode, so as to perform power management.

SUMMARY

Disclosed is a storage device, which can improve performance and lifetime by determining whether or not performing an LSB backup operation or synchronization operation, that is, whether or not performing an SPOR operation, based on battery information including information about whether or not a battery is detachable, and a data processing system including the storage device.

According to an aspect of an exemplary embodiment, a data processing system may include a host; a storage device including a memory configured to store data received from the host, a cache configured to temporarily store the data, and a controller configured to control the memory and the cache; and a battery supplying a power to the host and the storage device. The controller may be further configured to receive a detachability attribute of the battery from the host, and determine, based on the detachability attribute of the battery, whether to perform a backup operation of the data in response to receiving a write command from the host.

According to an aspect of an exemplary embodiment, a storage device may include: an interface configured to receive a command and data from a host; a memory configured to store the received data; a cache configured to temporarily store the data; and a controller configured to control the memory and the cache based on the command received from the host, The command may include a detachability attribute of a battery supplying power to the storage device, The data may include a least significant bit (LSB) and a most significant bit (MSB). The controller may be further configured to determine, based on the detachability attribute of the battery, whether to perform a backup operation of storing the LSB of the data in one of the memory and the cache, in response to receiving a write command from the host.

According to an aspect of an exemplary embodiment, a storage device may include: an interface configured to receive a command and data from a host; a memory configured to store the received data; a cache configured to temporarily store the data; and a controller configured to control the memory and the cache based on the command of the host. The command may include a detachability attribute of a battery supplying power to the storage device. The controller may be further configured to determine, based on the detachability attribute of the battery, whether to perform a backup operation of storing a least significant bit (LSB) of the data in one of the memory and the cache in response to receiving a write command from the host.

According to an aspect of an exemplary embodiment, a data processing system may include: a host; a storage device, and a battery supplying power to the host and the storage device. The storage device may include a memory configured to store data received from the host, a cache configured to temporarily store the data, and a controller configured to control the cache. The controller may be further configured to receive a charging operation state attribute indicating a charging operation state of the battery from the host, and determine, based on the charging operation state attribute, whether to perform hibernation in response to receiving a hibernation enter request from the host.

Also provided is a storage device, which can improve performance and lifetime by determining whether or not performing hibernation based on battery information including information about whether or not a battery charging operation is performed.

However, aspects of the present disclosure are not restricted to the one set forth herein. The above and other aspects of the present disclosure will become more apparent to one of ordinary skill in the art to which the present disclosure pertains by referencing the detailed description of the present invention given below.

BRIEF DESCRIPTION OF THE DRAWINGS

The above and other aspects and features of the present disclosure will become more apparent by describing in detail various exemplary embodiments thereof with reference to the attached drawings, in which.

DETAILED DESCRIPTION OF THE EMBODIMENTS

Hereinafter, a storage device and a data processing system including the same according to various exemplary embodiments will be described in detail with reference to FIGS. 1 to 11.

Figure 1:
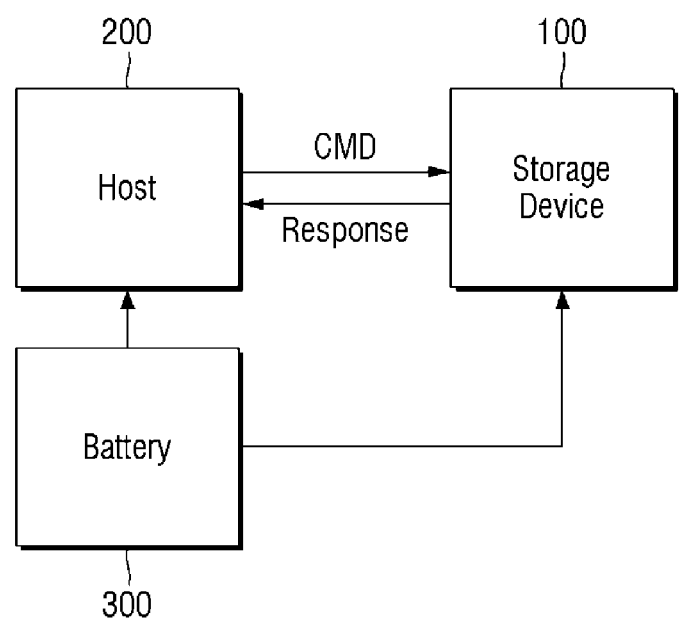
FIG. 1 is a block diagram for illustrating a data processing system according to an exemplary embodiment.

FIG. 1 is a block diagram for illustrating a data processing system according to an exemplary embodiment.

As shown in FIG. 1, the data processing system may include a storage device 100, a host 200, and a battery 300. Here, each component may constitute a separate chip, module, or device, and may also be included in one device. For example, the storage device 100 may be connected to the host 200 and then used. However, the present disclosure is not limited thereto, and the storage device 100 and the host 200 may be integrated into one device.

The host 200 may send a request such as read or write command to the storage device 100 using an application or a file system. For example, the host 200 may transfer a command CMD for instructing the performance of a write operation or a synchronization operation to the storage device 100. The storage device 100 may transfer to the host 200 a response message in response to the request (e.g., write command or synchronization command) included in the command.

The storage device 100 may control an internal operation (e.g., a read or write operation, a synchronization operation, or the like) according to the request from the host 200.

The storage device 100 may include a non-volatile memory device. For example, the storage device 100 may include a PC card (also known as Personal Computer Memory Card International Association or PCMCIA), a compact flash card (CFC), a smart media card (SMC), a memory stick, a multimedia card (MMC, RS-MMC, MMC-micro), an SD card (SD, miniSD, microSD, SDHC), an universal flash memory device (UFS), an embedded multimedia card (Emmc), and the like. However, the present disclosure is not limited thereto.

The battery 300 may supply power to the components included in the data processing system. That is, the battery 300 may supply power to the storage device 100 and the host 200. The battery 300 may be a detachable battery configured to be detached from the data processing system, or a fixed battery that is not detachable from the data processing system.

The battery has a detachable or fixed attribute in the data processing system. That is, when the battery 300 can be physically separated from the data processing system, the battery is considered a detachable battery. Conversely, when the battery 300 cannot be physically separated from the data processing system, the battery is considered a fixed battery.

When the battery 300 is a detachable battery, the power supplied to the storage device 100 and the host 200 may be interrupted in an unexpected situation. In order to prepare for this case, the storage device 100 may perform a sudden power off recovery (SPOR) operation. The SPOR operation will be described in detail later.

However, when the battery 300 is a fixed battery, the power supplied to the storage device 100 and the host 200 is rarely interrupted unexpectedly. In this case, the storage device 100 need not perform the SPOR operation. When the storage device 100 does not perform the SPOR operation, the resource of the data processing system, necessary for performing the SPOR operation, is saved, so as to improve the performance and lifetime of the data processing system.

The host 200 may transfer information about the battery 300, that is, battery information to the storage device 100. The battery information may include a detachability attribute of the battery 300, a charge rate of the battery 300, a charging operation state attribute of the battery 300, and the like. The detachability attribute of the battery 300 is information indicating whether the battery 300 is detachable or fixed, and the charge rate of the battery 300 is information indicating what percentage of the battery 300 is charged. In addition, the charging operation state attribute of the battery 300 may indicate whether the battery 300 is currently charging or not. Details thereof will be described later with reference to FIGS. 3 to 9.

Further, the host 200 may transfer a data protection attribute to the storage device 100. Details thereof will be described later with reference to FIG. 5. According to an aspect of an exemplary embodiment, the data protection attribute transferred from the host 200 to the storage device 100 may be included in the above-described battery information, or may be transferred separately from the battery information.

The host 200 may transfer the battery information and the data protection attribute to the storage device 100 using a query request protocol, but the scope of the present disclosure is not limited thereto.

Figure 2:
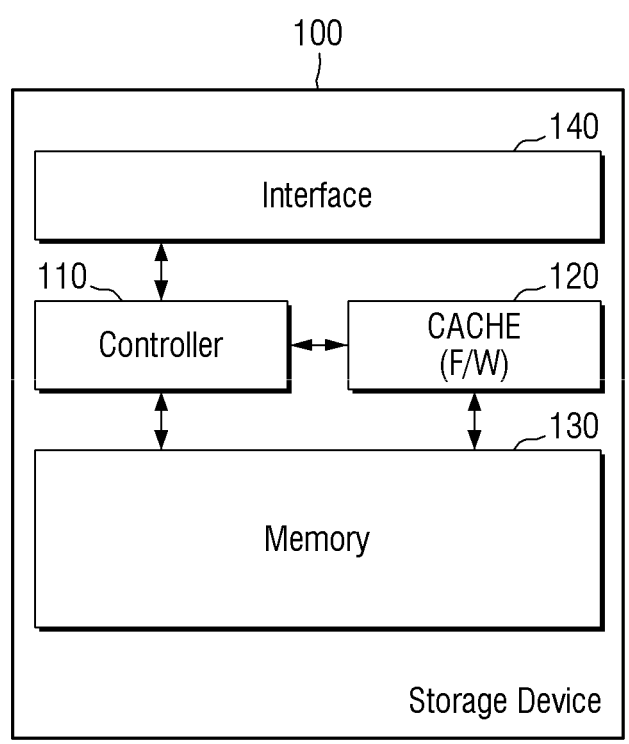
FIG. 2 is a block diagram for illustrating a storage device according to an exemplary embodiment.

FIG. 2 is a block diagram for illustrating a storage device according to an exemplary embodiment.

As shown in FIG. 2, the storage device 100 may include a controller 110, a cache 120, a memory 130, and an interface 140.

The controller 110 may control the cache 120, the memory 130, and the interface 140. The controller 110 may execute commands and perform data exchanges between the host 200 and the memory 130 and between the host 200 and the cache 120 through the interface 140.

The cache 120 may temporarily store the data received from the host 200. The cache 120 may include high-speed volatile memory or non-volatile memory. For example, the cache 120 may be SRAM or single level cell (SLC) area of flash memory, but the present disclosure is not limited thereto.

The cache 120 may load firmware (F/W), and may provide the firmware (F/W) to the controller 110 when the controller 110 calls for it. The firmware (F/W) may include various commands necessary for the operation of the controller 110. The commands may consist of machine language (e.g., assembly language), and firmware code (F/W code) for performing a specific operation may be created by the combination thereof. However, the present disclosure is not limited thereto.

The memory 130 may store the data received from the host 200. The memory 130 may include a non-volatile memory. For example, the memory 130 may be a flash memory including NAND flash. The flash memory may include SLC and MLC areas. However, the present disclosure is not limited thereto.

The interface 140 may be operable with a protocol for performing the data exchange between the host 200 and the controller 110. For example, the interface 140 may be configured to communicate with the host 200 through at least one of various communications protocols, such as Universal Serial Bus (USB), multimedia card (MMC), peripheral component interconnection (PCI), PCI-express (PCI-E), Advanced Technology Attachment (ATA), Serial-ATA (SATA), Parallel-ATA (PATA), Small Computer Small Interface (SCSI), Enhanced Small Disk Interface (ESDI), Integrated Drive Electronics (IDE), and Query Request protocol.

The storage device 100 may further include a data bus through which the controller 110, the cache 120, the memory 130, and the interface can exchange data with each other. The data bus corresponds to a path through which data is transmitted, and may be operable with a protocol for performing data exchange.

The storage device 100 of the present invention may perform an SPOR operation in order to ensure the integrity of the data received from the host 200. The SPOR operation includes a backup operation or a synchronization operation.

Specifically, when the storage device 100 receives a write command (Write CMD) for the data received from the host 200, the storage device 100 may perform a backup operation for recording the received data in the memory 130. In this case, in order to prepare for an unexpected situation (e.g., interruption of power supply) while recording the received data, the storage device 100 may perform a backup operation for storing a part of the data in the cache 120 operating at high speed or the high-speed area of the memory 130.

More specifically, the data received from the host 200 may include the LSB and the MSB. The controller 110 may temporarily store the LSB in the cache 120 or the high-speed area (e.g., SLC area) of the memory in order to prepare for an unexpected situation during a write command (Write CMD) for recording the received data.

Further, when the storage device 100 receives a synchronization command (Sync CMD) for the data received from the host 200, the storage device 100 may perform a synchronization operation for transmitting the data stored in the cache 120 to the memory 130.

Through such an SPOR operation, the storage device 100 and the data processing system including the same can ensure the integrity of data. However, as a trade-off thereto, excessive use of the cache 120 and the memory 130 may cause deterioration in performance and lifetime.

Thus, the controller 110 may determine whether or not to perform the SPOR operation depending on the detachability attribute of the battery 300.

If the detachability attribute of the battery 300 is a fixed type, the data processing system may not perform the SPOR operation. In this case, the resource of the data processing system, which may be necessary for performing the SPOR operation, can be saved, so as to improve the performance of the entire data processing system and increase the lifetime of the storage device.

Hereinafter, the operations of the storage device and the data processing system including the same will be described with regard to the detachability attribute of the battery 300.

Figure 3:
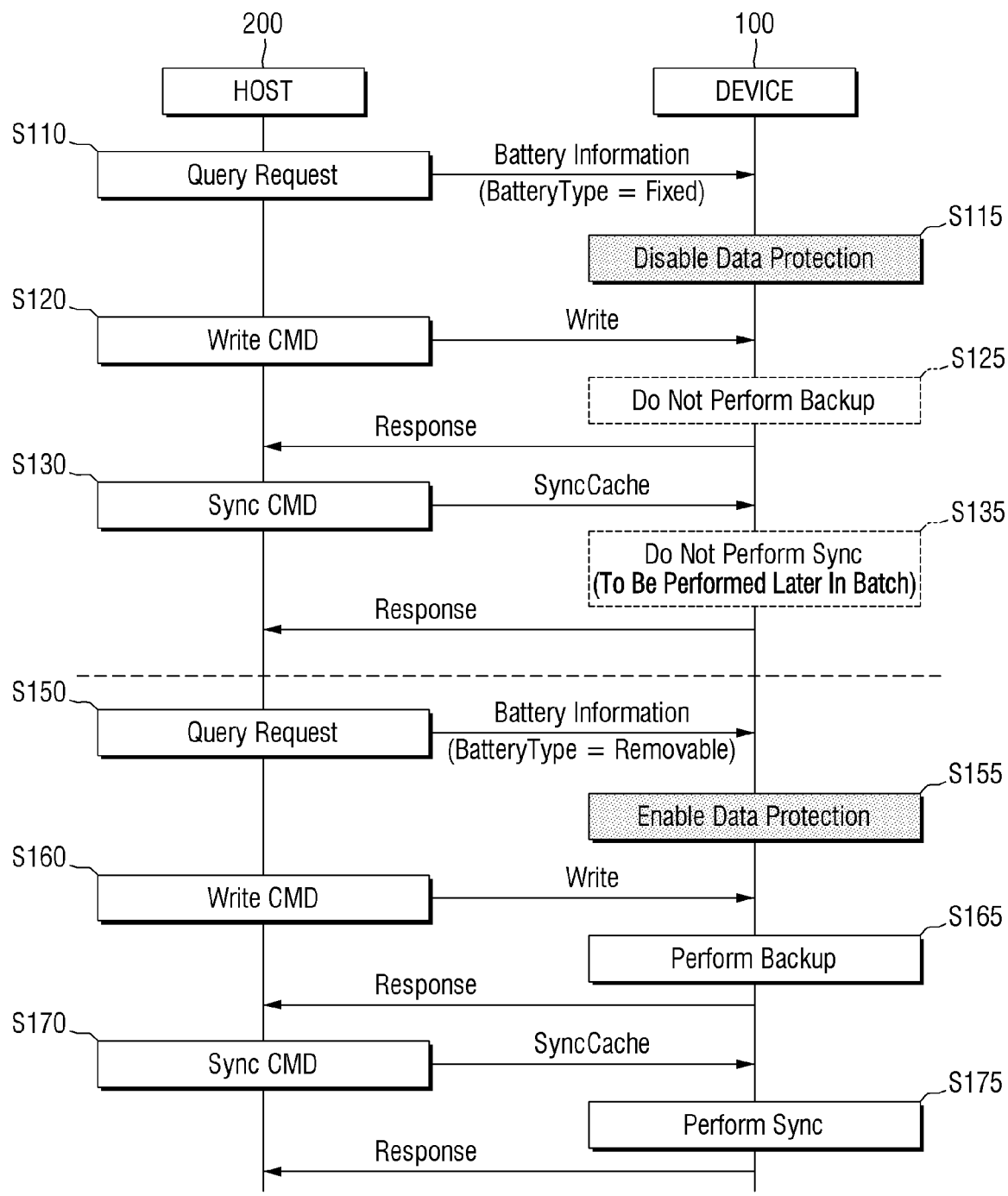
FIG. 3 is a flowchart for illustrating the operation of a data processing system according to an exemplary embodiment.

FIG. 3 is a flowchart for illustrating the operation of a data processing system according to an exemplary embodiment.

As shown in FIG. 3, when the detachability attribute of the battery 300 is a fixed type, the data processing system may disable a data protection function. Conversely, when the detachability attribute of the battery 30 is a detachable type, the data processing system may enable a data protection function.

Specifically, the host 200 of the data processing system may transfer the battery information including the detachability attribute of the battery 300 to the storage device 100 (S110). In this case, the detachability attribute of the battery 300 is a fixed type. The host 200 may transfer the battery information including the detachability attribute of the battery 300 to the storage device 100 using a query request protocol.

Subsequently, the storage device 100 may receive the battery information including the detachability attribute of the battery 300 from the host 200, and then disable a data protection function, that is, an SPOR operation (protection disable) (S115).

Subsequently, the host 200 may transfer a data write command (Write CMD) to the storage device 100 (S120).

Thus, since the storage device 100 is in a state in which the SPOR operation is disabled, the storage device 100 may only transfer a response signal to indicate work completion to the host 200 without performing a backup operation (S125).

Subsequently, the host 200 may transfer a synchronization command (Sync CMD) to the storage device 100 (S130).

Again, since the storage device 100 is in a state in which the SPOR operation is disabled, the storage device 100 may only transfer a response signal to indicate work completion to the host 200 without performing a synchronization operation for transmitting the data stored in the cache 120 (S135). In this case, the storage device 100 may perform the synchronization operation once a predetermined amount of data is stored in the cache 120, instead of performing the synchronization operation immediately after the synchronization command (Sync CMD) is received.

In the data processing system, the host 200 may transfer the battery information including the detachability attribute of the battery 300 to the storage device 100 (S150). In this case, the detachability attribute of the battery 300 is a detachable type. The host 200 may transfer the battery information including the detachability attribute of the battery 300 to the storage device 100 using a query request protocol.

Subsequently, the storage device 100 may receive the battery information including the detachability attribute of the battery 300 from the host 200, and then enable a data protection function, that is, an SPOR operation (protection enable) (S155).

Subsequently, the host 200 may transfer a data write command (Write CMD) to the storage device 100 (S160).

Thus, since the storage device 100 is in a state in which the SPOR operation is enabled, the storage device 100 may perform a backup operation. Specifically, the storage device 100 may perform an LSB backup operation for storing the LSB of the LSM and MSB included in the received data in the cache 120 or the high-speed area (e.g., SLC) of the memory 130. However, the present disclosure is not limited thereto. After the completion of the backup operation, the storage device 100 may transfer a response signal to indicate work completion to the host 200 (S165).

Subsequently, the host 200 may transfer a synchronization command (Sync CMD) to the storage device 100 (S170).

Since the storage device 100 is in a state in which the SPOR operation is enabled, the storage device 100 may perform a synchronization operation for transmitting the data stored in the cache 120 to the memory 130. After the completion of the synchronization operation, the storage device 100 may transfer a response signal to indicate work completion to the host 200 (S175).

That is, when the detachability attribute of the battery 300 is a fixed type, the SPOR operation is not performed, thereby improving the performance of the system and the lifetime of the storage device. The order in which the various commands are transmitted from the host 200 to the storage device 100 may be different from what is shown in FIG. 3 and other figures. For example, the host 200 may send battery information indicating a detachable battery type to the storage device 100 thereby enabling the data protection function, and then send battery information indicating a fixed battery type thereby disabling the data protection function. Similarly, the host 200 may send the Sync CMD to the storage device 100 first, and then send the Write CMD to the storage device 100.

Figure 4:
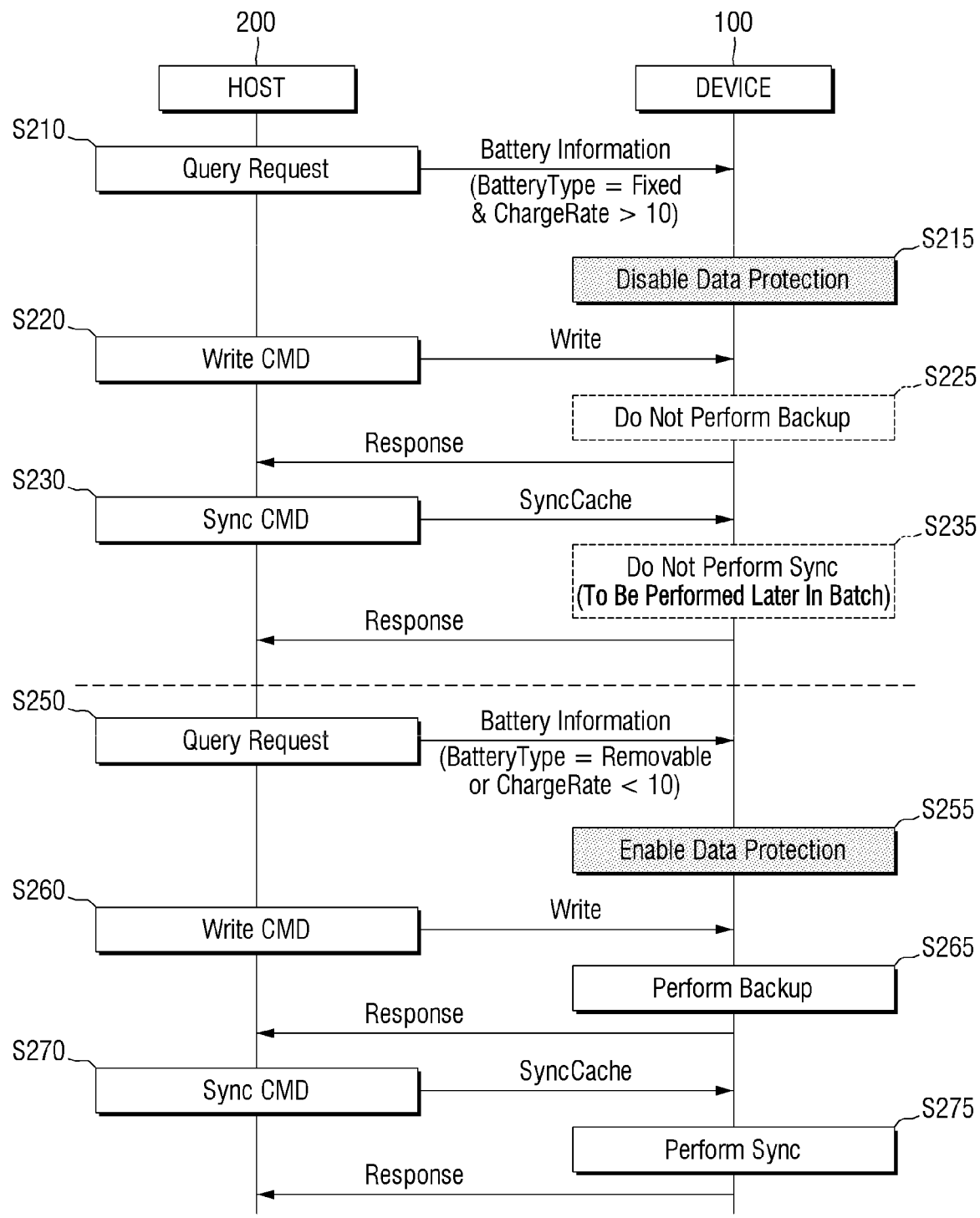
FIG. 4 is a flowchart for illustrating the operation of a data processing system according to an exemplary embodiment.

FIG. 4 is a flowchart for illustrating the operation of a data processing system according to an exemplary embodiment. For the convenience of explanation, hereinafter, the similar descriptions as those in the above-described exemplary embodiment will not be replicated, and differences will be mainly described.

As shown in FIG. 4, the storage device 100 may receive the battery information including the detachability attribute of the battery 300 and the charge rate of the battery 300 from the host 200. The charge rate of the battery 300 indicates how much of the battery 300 is charged in percentage.

When the detachability attribute of the battery 300 is a fixed type and the charge rate of the battery 300 is higher than a threshold charge rate (e.g., 10%), the data processing system may disable a data protection function. Conversely, when the detachability attribute of the battery 300 is a detachable type or the charge rate of the battery 300 is lower than the threshold charge rate (e.g., 10%), the data processing system may enable a data protection function.

In another example, the detachability attribute of the battery 300 may be a fixed type and the charge rate of the battery 300 may be higher than the threshold charge rate (e.g., 10%). In this case, the host 200 may transfer the battery information including the detachability attribute of the battery 300 and the charge rate of the battery 300 to the storage device 100 (S210).

Subsequently, the storage device 100 may receive the battery information including the detachability attribute of the battery 300 and the charge rate of the battery 300 from the host 200, and then determine whether to perform a data protection function, that is, an SPOR operation (S215). In this case, since the detachability attribute of the battery 300 is a fixed type and the charge rate of the battery 300 is higher than the threshold charge rate (e.g., 10%), the SPOR operation may be disabled (Protection Disable).

Subsequently, the host 200 may transfer a data write command (Write CMD) to the storage device 100 (S220).

Since the storage device 100 is in a state in which the SPOR operation is disabled, the storage device 100 may only transfer a response signal to indicate work completion to the host 200 without performing a backup operation (S225).

Subsequently, the host 200 may transfer a synchronization command (Sync CMD) to the storage device 100 (S230).

Since the storage device 100 is in a state in which the SPOR operation is disabled, the storage device 100 may only transfer a response signal to indicate work completion to the host 200 without performing a synchronization operation for transmitting the data stored in the cache 120 to the memory 130 (S235).

In another example, the detachability attribute of the battery 300 may be a detachable type and the charge rate of the battery 300 may be lower than the threshold charge rate (e.g., 10%). In this case, the host 200 may transfer the battery information including the detachability attribute of the battery 300 and the charge rate of the battery 300 to the storage device 100 (S250).

Subsequently, the storage device 100 may determine whether or not to enable the SPOR operation, based on the received detachability attribute and charge rate of the battery 300 (S255). In this case, since the detachability attribute of the battery 300 is detachable type or the charge rate of the battery 300 is lower than the threshold charge rate (e.g., 10%), the SPOR operation may be enabled (protection enable).

Subsequently, the host 200 transfers a data write command (Write CMD) to the storage device 100 (S260).

Since the storage device 100 is in a state in which the SPOR operation is enabled, the storage device 100 may perform a backup operation. Specifically, the storage device 100 may perform an LSB backup operation for storing the LSB of the LSM and MSB included in the received data in the cache 120 or the high-speed area (e.g., SLC) of the memory 130. After the completion of the backup operation, the storage device 100 may transfer a response signal to indicate work completion to the host 200 (S265).

Subsequently, the host 200 may transfer a synchronization command (Sync CMD) to the storage device 100 (S270).

Thus, since the storage device 100 is in a state in which the SPOR operation is enabled, the storage device 100 may perform a synchronization operation for transmitting the data stored in the cache 120 to the memory 130. After the completion of the synchronization operation, the storage device 100 may transfer a response signal to indicate work completion to the host 200 (S275).

That is, in the data processing system 300, whether or not to perform the SPOR operation may be determined based on the detachability attribute of the battery 300 and the charge rate of the battery 300, thereby improving the performance of the system and the lifetime of the storage device while maintaining the stability of the system high.

Figure 5:
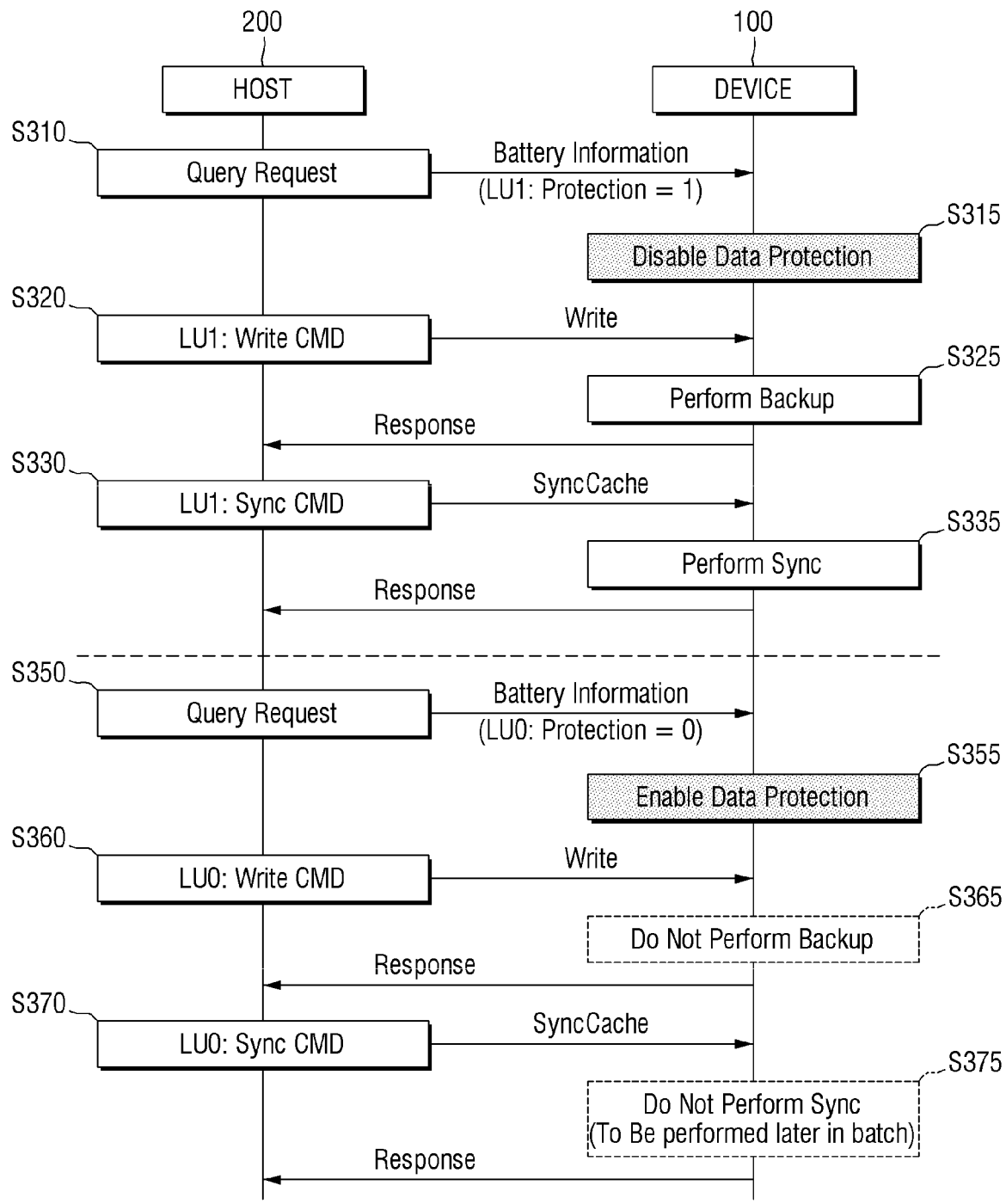
FIG. 5 is a flowchart for illustrating the operation of a data processing system according to an exemplary embodiment.

FIG. 5 is a flowchart for illustrating the operation of a data processing system according to an exemplary embodiment. For the convenience of explanation, hereinafter, duplicative descriptions will be omitted, and differences will be mainly described.

As shown in FIG. 5, the storage device 100 may receive the detachability attribute of the battery 300 and the data protection attribute from the host 200. As described above with reference to FIG. 1, the data protection attribute transferred from the host 200 to the storage device 100 may be included in the battery information together with the detachability attribute of the battery 300, or may be transferred separately from the battery information (S310). Meanwhile, the data received from the host 200 to the storage device 100 may include a plurality of logical units (LU).

The host 200 may set a protection attribute for each logical unit LU. The storage device 100 may determine whether or not to perform the SPOR operation, based on the protection attribute of the received logical unit LU.

However, in this embodiment, when the detachability attribute of the battery 300 is a detachable type, the SPOR operation is unconditionally performed. Therefore, the protection attribute of the logical unit LU may be considered only when the detachability attribute of the battery is a fixed type.

For example, when the detachability attribute of the battery 300 is a fixed type and the data protection attribute of the received first logical unit LU1 is enabled (e.g., when the data protection value included in the protection attribute is "1"), the data processing system may enable a data protection function (S315).

Subsequently, the host 200 may transfer a data write command (Write CMD) to the storage device 100 (S320). Thus, since the storage device 100 is in a state in which the SPOR operation is enabled, the storage device 100 may perform a backup operation (S325). Specifically, the storage device 100 may perform an LSB backup operation for storing the LSB of the LSM and MSB included in the received data in the cache 120 or the high-speed area (e.g., SLC) of the memory 130. After the completion of the backup operation, the storage device 100 transfers a response signal to indicate work completion to the host 200.

Subsequently, the host 200 may transfer a data synchronization command (Sync CMD) to the storage device 100 (S330). Thus, since the storage device 100 is in a state in which the SPOR operation is enabled, the storage device 100 may perform a synchronization operation for transmitting the data stored in the cache 120 to the memory 130 (S335). After the completion of the synchronization operation, the storage device 100 may transfer a response signal to indicate work completion to the host 200.

As another example, when the detachability attribute of the battery 300 is a fixed type and the protection attribute of the received second logical unit LU0 is disabled (e.g., when the data protection value included in the protection attribute is "0"), the data processing system may enable a data protection function (S350, S355).

Subsequently, the host 200 may transfer a data write command (Write CMD) to the storage device 100 (S360). Thus, since the storage device 100 is in a state in which the SPOR operation is disabled, the storage device 100 may only transfer a response signal to indicate work completion to the host 200 without performing a backup operation (S365).

Subsequently, the host 200 may transfer a synchronization command (Sync CMD) to the storage device 100 (S370). Since the storage device 100 is in a state in which the SPOR operation is disabled, the storage device 100 may only transfer a response signal to indicate work completion to the host 200 without performing a synchronization operation for transmitting the data stored in the cache 120 to the memory 130 (S375).

That is, in the data processing system 300, whether or not to perform the SPOR operation is determined based on the detachability attribute of the battery 300 and the data protection attribute of the plurality of logical units LU included in the data, thereby improving the performance of the system and the lifetime of the storage device while maintaining the stability of the system high.

Figure 6:
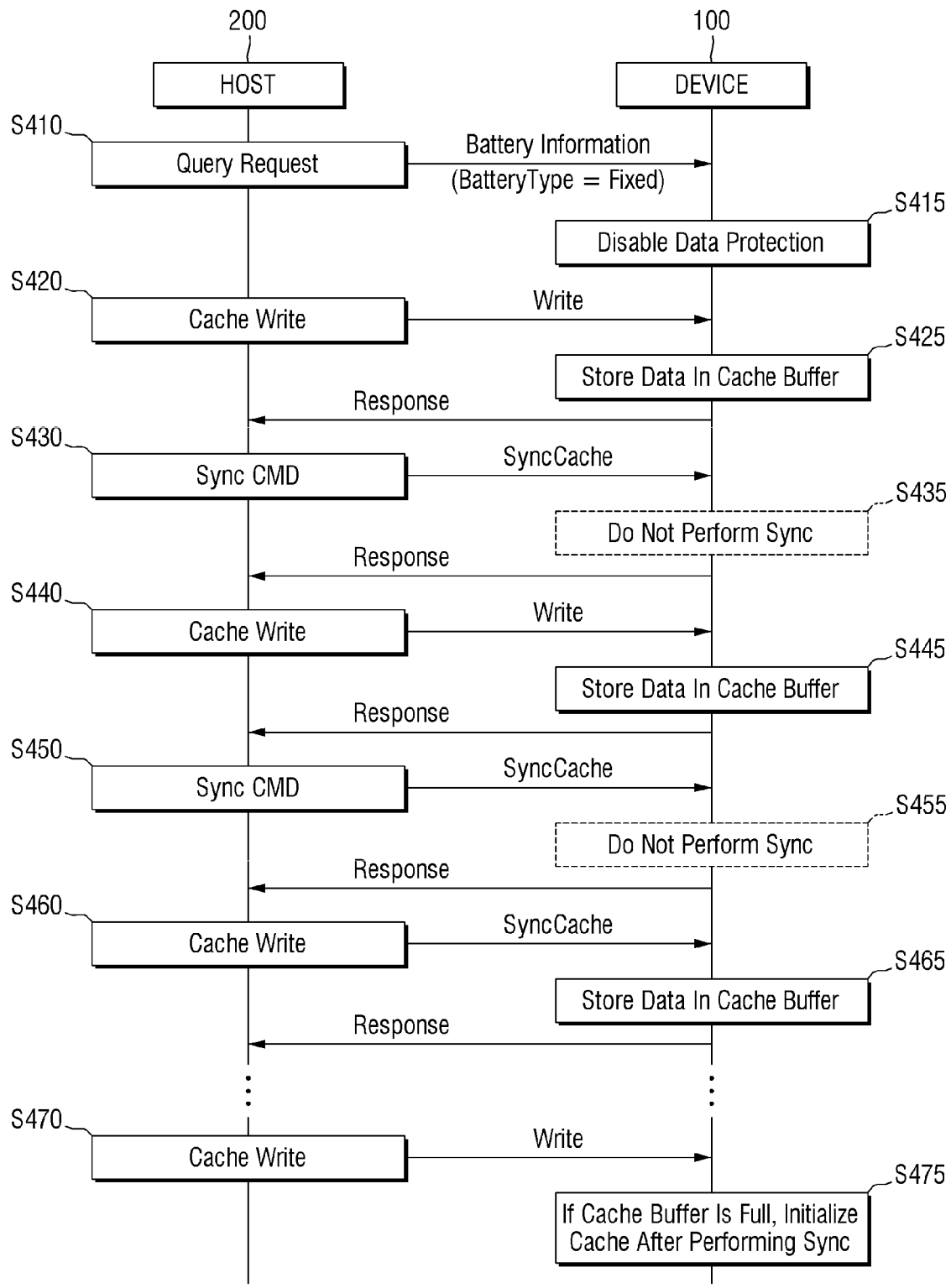
FIG. 6 is a flowchart for illustrating the operation of a data processing system according to an exemplary embodiment.

FIG. 6 is a flowchart for illustrating the operation of a data processing system according to an exemplary embodiment of the present invention. For the convenience of explanation, hereinafter, duplicative descriptions will be omitted, and differences will be mainly described.

As shown in FIG. 6, the host 200 may transfer the battery information including the detachability attribute of the battery 300 to the storage device 100 (S410). In this case, the detachability attribute of the battery 300 is a fixed type.

Subsequently, the storage device 100 may receive the battery information including the detachability attribute of the battery 300 from the host 200, and then determine whether to enable the SPOR operation (S415). In this case, since the detachability attribute of the battery 300 is a fixed type, the SPOR operation is disabled (protection disable).

Subsequently, the host 200 may transfer a cache write command (Cache Write CMD) to the storage device 100 (S420). Thus, the storage device 100 may store the data received from the host 200 in the buffer of the cache 120 regardless of the enabling of the SPOR operation (S425). After the completion of the operation, the storage device 100 may transfer a response signal to indicate work completion to the host 200.

Subsequently, the host 200 may transfer a synchronization command (Sync CMD) to the storage device 100 (S430). Since the storage device 100 is in a state in which the SPOR operation is disabled, the storage device 100 may only transfer a response signal to indicate work completion to the host 200 without performing a synchronization operation for transmitting the data stored in the cache 120 to the memory 130 (S435).

Subsequently, in operations S440 to S465, the aforementioned operations S420 to S435 may be repeated. In this case, these operations may be performed in a sequence different from the order shown in FIG. 6.

Subsequently, once the storage space of the buffer of the cache 120 is full, when the storage device 100 receives another cache write command (Cache Write CMD) from the host 200 (S470), a synchronization operation for transmitting the data stored in the cache 120 to the memory 130 may be performed, and then the cache 120 (e.g., SRAM) may be initialized (S475).

That is, the synchronization command (Sync CMD) may not be performed until the storage space of the buffer of the cache 120 is full, at which point the synchronization operation is performed in batch to save the resource of the system. Thus, the performance of the system and the lifetime of the storage device may be improved while maintaining the stability of the system high.

Figure 7:
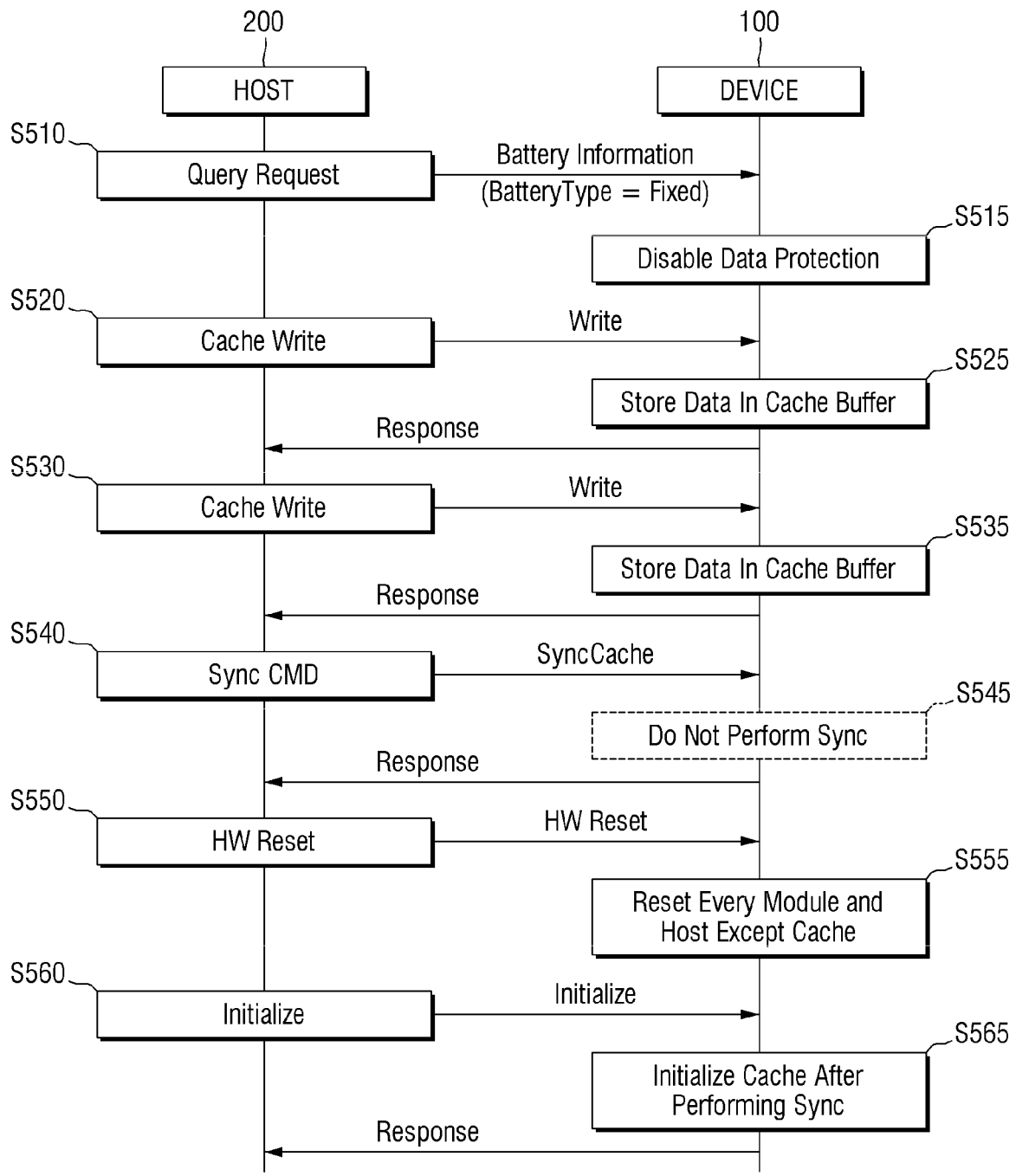
FIG. 7 is a flowchart for illustrating the operation of a data processing system according to an exemplary embodiment.

FIG. 7 is a flowchart for illustrating the operation of a data processing system according to an exemplary embodiment. For the convenience of explanation, hereinafter, duplicative descriptions will be omitted, and differences will be mainly described.

As shown in FIG. 7, the host 200 may transfer the battery information including the detachability attribute of the battery 300 to the storage device 100 (S510). In this example, the detachability attribute of the battery 300 may be a fixed type.

Subsequently, the storage device 100 may receive the battery information including the detachability attribute of the battery 300 from the host 200, and then determine whether to enable the SPOR operation (S515). In this case, since the detachability attribute of the battery 300 is a fixed type, the SPOR operation may be disabled (protection disable).

Subsequently, the host 200 may transfer a cache write command (Cache Write CMD) to the storage device 100 (S520). The storage device 100 may store the data received from the host 200 in the buffer of the cache 120 regardless of the enabling of the SPOR operation (S525). After the completion of the operation, the storage device 100 may transfer a response signal to indicate work completion to the host 200.

Subsequently, in operations S530 to S535, the aforementioned operations S520 to S525 are repeated.

Subsequently, the host 200 may transfer a synchronization command (Sync CMD) to the storage device 100 (S540). Since the storage device 100 is in a state in which the SPOR operation is disabled, the storage device 100 may transfer only a response signal to indicate work completion to the host 200 without performing a synchronization operation for transmitting the data stored in the cache 120 to the memory 130 (S545).

Subsequently, the host 200 may transfer a hardware reset command (HW reset CMD) to the storage device 100. Thus, the storage device 100 may reset all other components (e.g., the controller 110, the memory 130, and the interface 140) except for the cache 120 (S555). In this case, the host itself may also perform the reset operation.

Subsequently, the host 200 may transfer an initialization command to the storage device 100. The storage device 100 may reset all other components (e.g., the controller 110, the memory 130, and the interface 140) except for the cache 120, perform a synchronization operation for transmitting the data stored in the cache 120 to the memory 130, and then initialize the cache 120 (S565). The storage device 100 may transfer a response signal to indicate work completion to the host 200.

That is, data may be stored in the cache 120 without subsequently performing the synchronization command (Sync CMD). However, when the hardware reset command is provided, all other components except for the cache 120 may be reset and initialized, and then the cache is synchronized, thereby safely preserving the data stored in the cache 120. Thus, the performance of the system and the lifetime of the storage device can be improved while maintaining the stability of the data processing system of the present invention high.

Hereinafter, specific operations of the storage device 100 and the data processing system including the storage device 100 according to the charging operation state attribute of the battery 300 will be described.

Figure 8:
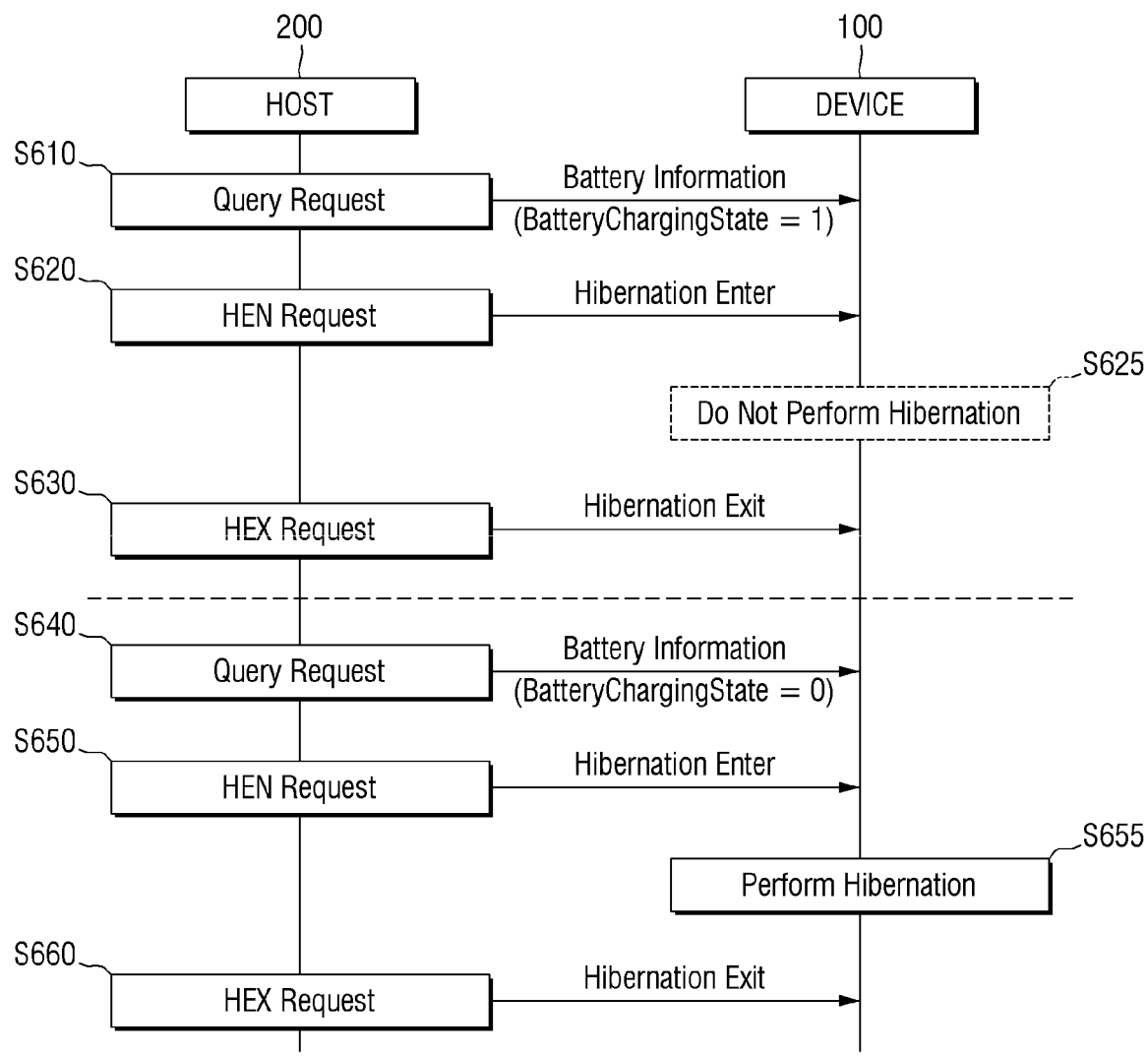
FIG. 8 is a flowchart illustrating the operation of a data processing system according to an exemplary embodiment.

FIG. 8 is a flowchart illustrating the operation of a data processing system according to an exemplary embodiment.

As shown in FIG. 8, when the battery 300 is charging, the data processing system may not perform hibernation (e.g., low-power operation mode during which content of the random access memory (RAM) is stored in a non-volatile memory). Conversely, when the battery 300 is not charging, the data processing system may perform hibernation.

Specifically, the host 200 may transfer battery information including a charging operation state attribute of the battery 300 to the storage device 100 (S610). At this time, the charging operation state attribute of the battery 300 may have a first value (e.g., "1") indicating that the battery 300 is charging at that time. The host 200 may transfer the battery information including the charging operation state attribute of the battery 300 using a query request protocol.

Subsequently, the host 200 may transmit a hibernation enter request (HEN request) to the storage device 100 (S620).

The storage device 100 may not perform hibernation because the charging operation state attribute indicates that the battery 300 is charging at that time (S625).

Thereafter, the host 200 may transmit the hibernation exit request (HEX request) to the storage device 100 (S630). Since the hibernation has not been performed in the storage device 100, the storage device 100 receiving the hibernation exit request (HEX request) may not perform any operation in response to the hibernation exit request (HEX request).

Meanwhile, the host 200 may transfer battery information including the charging operation state attribute of the battery 300 to the storage device 100 (S640). At this time, the charging operation state attribute of the battery 300 may have a second value (e.g., "0") indicating that the battery 300 is not charging at that time. The host 200 may transfer the battery information including the charging operation state attribute of the battery 300 using a query request protocol.

Subsequently, the host 200 may transmit the hibernation entry request (HEN request) to the storage device 100 (S650).

Thus, since the charging operation state attribute indicates that the battery 300 is not charging at that time, the storage device 100 may perform hibernation to enter the hibernation state (S655).

Thereafter, the host 200 may transmit the hibernation exit request (HEX request) to the storage device 100 (S660). The storage device 100 may terminate the hibernation according to the hibernation exit request (HEX request).

As such, the data processing system may selectively perform hibernation based on the charging operation state attribute of the battery 300. The performance of the data processing system and the lifetime of the storage device can be improved by adjusting the execution time of a background operation as described later with reference to FIG. 9 while selectively performing the hibernation.

Figure 9:
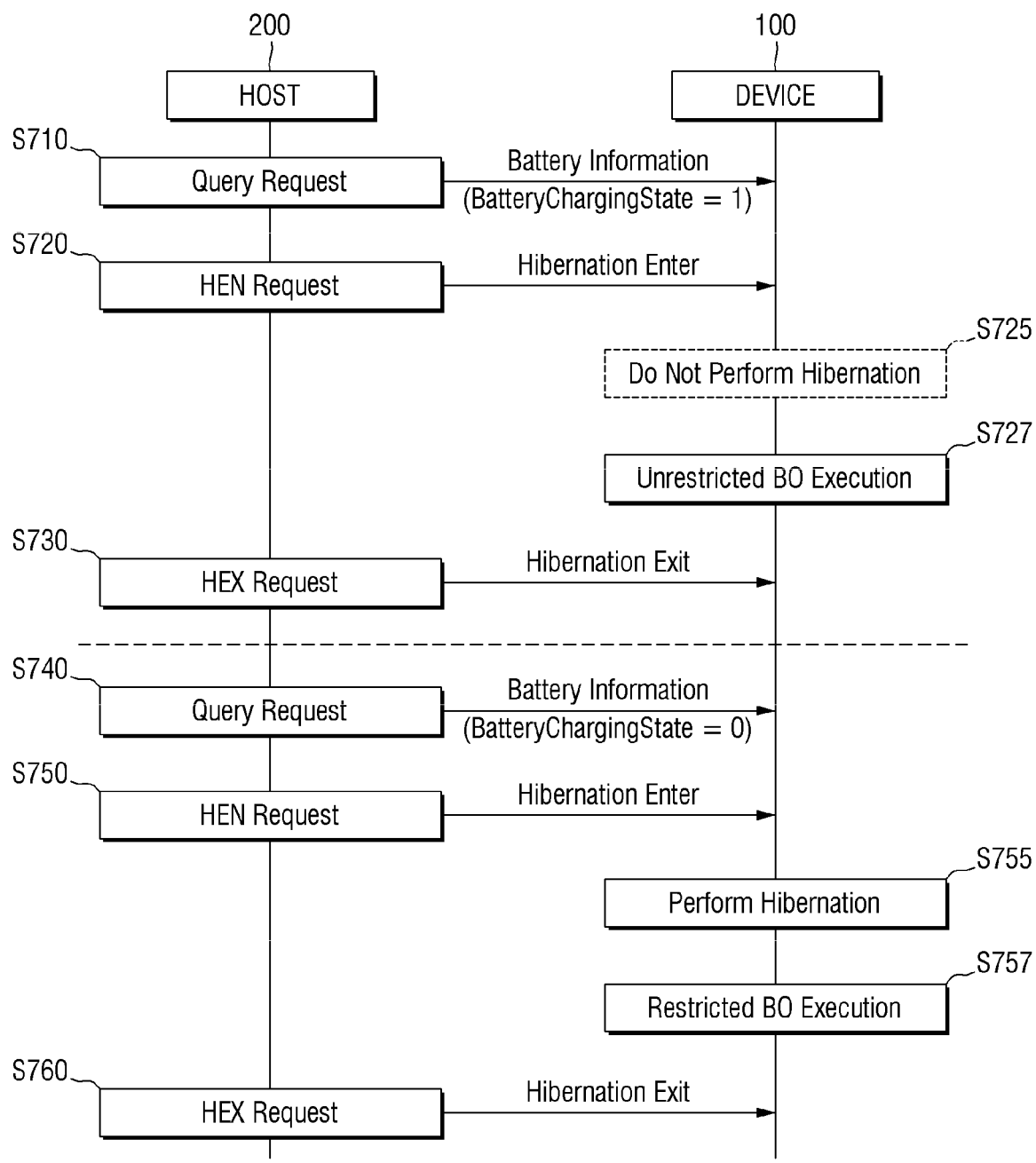
FIG. 9 is a flowchart illustrating the operation of a data processing system according to an exemplary embodiment.

FIG. 9 is a flowchart illustrating the operation of a data processing system according to an exemplary embodiment.

As shown in FIG. 9, when the battery 300 is charging, the data processing system may not perform hibernation and perform a background operation (BO) without restrictions. Conversely, when the battery 300 is not charging, the data processing system may perform hibernation and perform a background operation (BO) with restrictions.

Here, for example, when the memory 130 described with reference to FIG. 2 includes a NAND flash memory, the background operation may include a garbage collection operation, a wear-leveling operation, and the like, which are required to operate the NAND flash memory.

Specifically, the host 200 may transfer battery information including a charging operation state attribute of the battery 300 to the storage device 100 (S710). At this time, the charging operation state attribute of the battery 300 may have a first value (e.g., "1") indicating that the battery 300 is charging at that time. The host 200 may transfer the battery information including the charging operation state attribute of the battery 300 using a query request protocol.

Subsequently, the host 200 may transmit a hibernation enter request (HEN request) to the storage device 100 (S720).

Thus, the storage device 100 may not perform hibernation because the charging operation state attribute indicates that the battery 300 is charging at that time (S725).

Further, the storage device 100 may perform the background operation without restrictions (S727). Here, "without restrictions" means that there is no time limit for the background operation. That is, the storage device 100 may perform the background operation for a sufficient time while power is supplied without interruption because the battery 300 is charging.

Thereafter, the host 200 may transmit the hibernation exit request (HEX request) to the storage device 100 (S730). Since hibernation has not been performed in the storage device 100, the storage device 100 receiving the hibernation exit request (HEX request) need not perform any operation in response to the hibernation exit request (HEX request).

However, it should be noted that, in some exemplary embodiments, when the background operation performed in operation 727 (S727) is completed and thus there is no more work to be processed, hibernation may be performed in the storage device 100. In this case, when the host 200 transmits a hibernation exit request (HEX request) to the storage device 100 in operation 730 (S730), the storage device 100 may terminate the hibernation according to the received hibernation exit request (HEX request).

Meanwhile, the host 200 may transfer battery information including the charging operation state attribute of the battery 300 to the storage device 100 (S740). At this time, the charging operation state attribute of the battery 300 may have a second value (e.g., "0") indicating that the battery 300 is not charging at that time. The host 200 may transfer the battery information including the charging operation state attribute of the battery 300 using a query request protocol.

Subsequently, the host 200 may transmit the hibernation entry request (HEN request) to the storage device 100 (S750).

Since the charging operation state attribute indicates that the battery 300 is not charging at that time, the storage device 100 may perform hibernation to enter the hibernation state (S755).

Further, the storage device 100 may perform the background operation with restrictions (S757). Here, "with restrictions" means that background operation time is limited to a predetermined time. That is, the storage device 100 may perform the background operation only for a certain period of time when the battery 300 is not charging and thus the power source may not be stable.

Thereafter, the host 200 may transmit the hibernation exit request (HEX request) to the storage device 100 (S760). The storage device 100 may terminate the hibernation according to the hibernation exit request (HEX request).

As such, the performance of the data processing system and the lifetime of the storage device can be improved by selectively performing the hibernation depending on the charging operation state attribute of the battery 300 and adjusting the execution time of the background operation.

Figure 10:
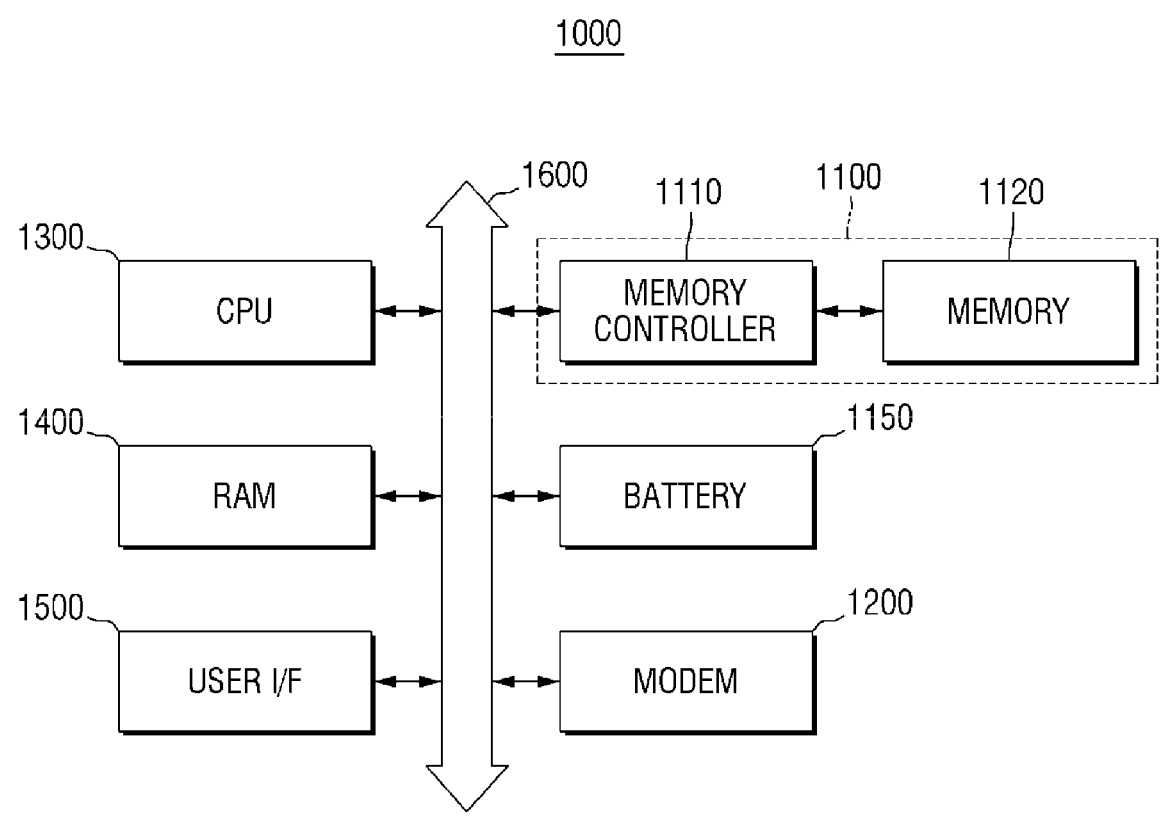
FIG. 10 is a block diagram showing a memory system including a data processing system according to an exemplary embodiment.

FIG. 10 is a block diagram showing a memory system including a data processing system according to an exemplary embodiment.

As shown in FIG. 10, the memory system 1000 may include a data processing system 1100, a battery 1150, a modem 1200, a central processing unit (CPU) 1300, a random access memory (RAM) 1400, a user interface 1500, and a system bus 1600. In this case, the data processing system 1100 of the memory system 1000 may be operated in the same manner as the aforementioned data processing system according to various exemplary embodiments.

The data processing system 1100 may include a memory controller 1110 and a memory 1120. The host 200 shown in FIG. 1 may be substantially the same as the memory controller 1110, and the storage device 100 shown in FIG. 1 may be substantially the same as the memory 1120.

The battery 1150 may supply power to all the components of the memory system 1000. The battery 1150 may be a detachable battery configured to be detached from the memory system 1000 or a fixed battery that is not configured be detachable from the data processing system. In this case, the memory controller 1110 may transfer the detachability attribute of the battery 1150 to the memory 1120. Additionally, the memory controller 1110 may transfer the charge rate of the battery 1150 and the protection attribute of logical unit (LU) to the memory 1120.

The modem 1200 may exchange data with an external device in a wired or wireless manner to transfer the data to the data processing system 1100. The CPU 1300 may perform operations necessary for driving the memory system 1000. The RAM 1400 may provide resources necessary for driving the memory system 1000. The user interface 1500 may receive data from users.

The memory system 1000 may be configured to employ an SSD. In this case, the data processing system may process a large amount of data stably and reliably. However, the present disclosure is not limited thereto.

The data processing system 1100 may be mounted using various types of packages. For example, the memory controller 1110 and/or the memory 1120 may be mounted using packages, such as Package on Package (PoP), ball grid arrays (BGAs), chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP). However, the present disclosure is not limited thereto.

Figure 11:
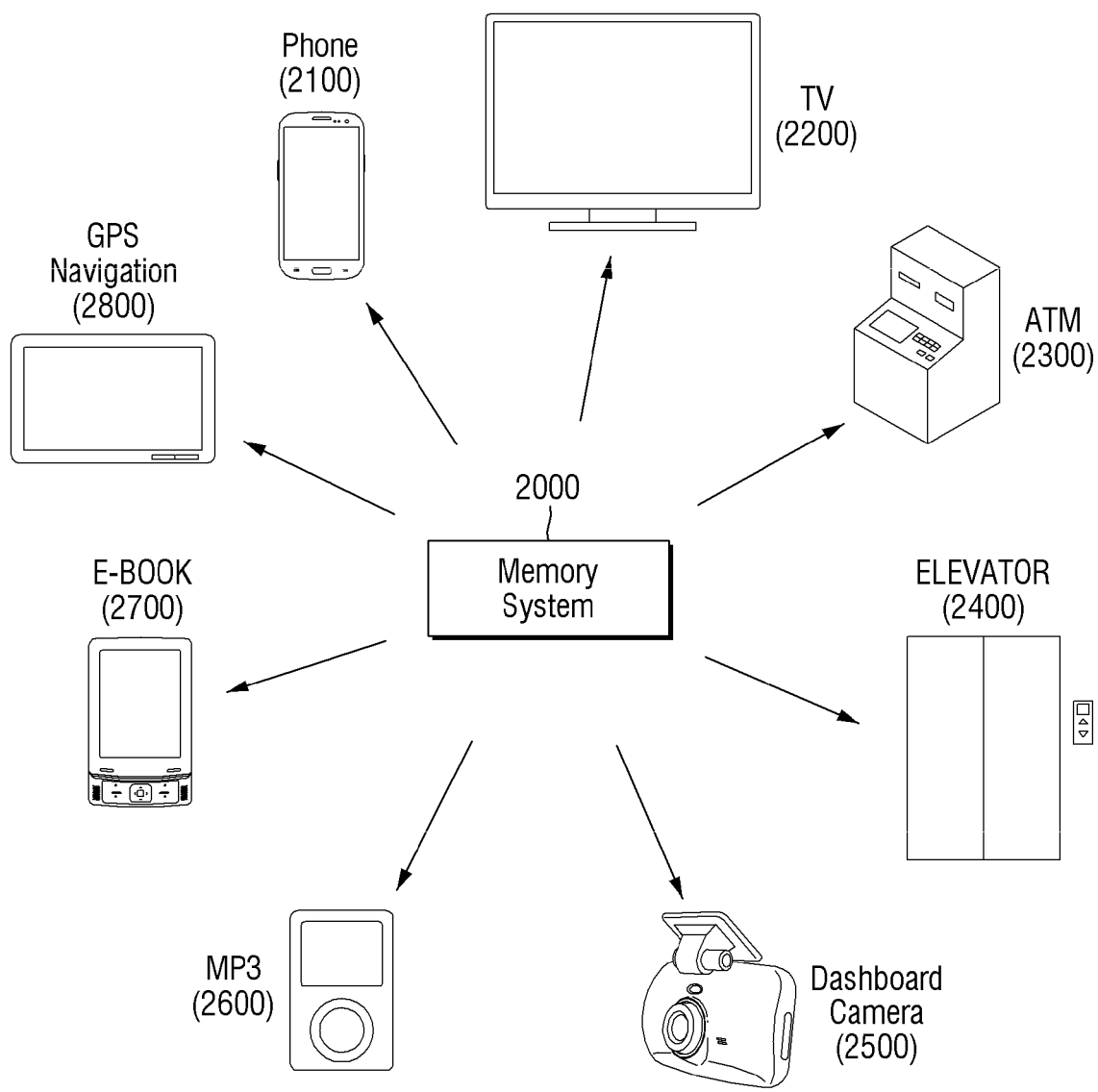
FIG. 11 is a view showing application examples of various electronic appliances mounted with a memory system including the data processing system according to an exemplary embodiment.

FIG. 11 is a view illustrating various exemplary applications for a memory system including the data processing system according to an exemplary embodiment.

As shown in FIG. 11, the memory system 2000 according to various exemplary embodiments may be employed in various electronic appliances. This memory system 2000 may be employed in various devices such as a mobile phone 2100, an automated teller machine (ATM) 2300, an elevator 2400, a dashboard camera 2500 used in automobiles and the like, a portable digital music player (e.g., an MP3 player) 2600, an e-book reader 2700, a global positioning system (GPS 2800, and the like.

The memory system 2000 may operate asynchronously with a processor of a system. Accordingly, it is possible to improve the function of an electronic appliance by reducing the driving load of the processor to allow the processor to operate at lower power and higher speed.

Although the various exemplary embodiments have been disclosed for illustrative purposes, those skilled in the art will appreciate that various modifications, additions and substitutions are possible, without departing from the scope and spirit of the present disclosure as disclosed in the accompanying claims.

What is claimed is:
1. A data processing system, comprising:
a host;
a storage device comprising:
    a memory configured to store data received from the host,
    a cache configured to temporarily store the data, and
    a controller configured to control the memory and the cache; and
a battery supplying a power to the host and the storage device,
wherein the controller is further configured to:
    receive a detachability attribute of the battery from the host, the detachability attribute indicating whether the battery is physically detachable from the data processing system, and
    determine, based on the detachability attribute of the battery, whether to perform a backup operation of the data in response to receiving a write command from the host, wherein the data includes a first logical unit and a second logical unit, wherein the controller is further configured to receive a protection attribute of the first logical unit from the host, wherein the controller is further configured to perform the backup operation of the first logical unit in response to the write command from the host, when the detachability attribute of the battery is a fixed type and the protection attribute of the first logical unit is enabled, and wherein the controller does not perform the backup operation of the first logical unit in response to the write command from the host, when the detachability attribute of the battery is the fixed type and the protection attribute of the first logical unit is disabled.

2. The data processing system of claim 1, wherein the controller is further configured to perform the backup operation of the data in response to the write command from the host, when the detachability attribute of the battery is a detachable type.

3. The data processing system of claim 1, wherein the controller does not perform a synchronization operation of the data in response to receiving a synchronization command from the host when the detachability attribute of the battery is the fixed type, and wherein the synchronization operation of the data comprises transmitting the data stored in the cache to the memory.

4. The data processing system of claim 1, wherein the controller is further configured to receive a charge rate of the battery from the host, wherein the controller does not perform the backup operation of the data in response to the write command from the host, when the detachability attribute of the battery is the fixed type and the charge rate of the battery is higher than a threshold charge rate, and wherein the controller is further configured to perform the backup operation of the data in response to the write command from the host, when the detachability attribute of the battery is the fixed type and the charge rate of the battery is lower than the threshold charge rate.

5. The data processing system of claim 1, wherein the data includes a least significant bit (LSB) and a most significant bit (MSB), and wherein the backup operation of the controller comprises storing the LSB in one from among the memory and the cache.

6. The data processing system of claim 1, wherein, when the detachability attribute of the battery is the fixed type, the controller is further configured to record the received data in the cache in response to receiving a cache write command from the host, and wherein the controller does not perform a synchronization operation of transmitting the data stored in the cache to the memory in response to a synchronization command of the host.

7. A storage device of a data processing system, the storage device comprising:

an interface configured to receive a command and data from a host;

a memory configured to store the received data;

a cache configured to temporarily store the data; and a controller configured to control the memory and the cache based on the command of the host, wherein the command includes a detachability attribute of a battery which supplies power to the storage device, the detachability attribute indicating whether the battery is physically detachable from the data processing system, wherein the controller is further configured to determine, based on the detachability attribute of the battery, whether to perform a backup operation of storing a least significant bit (LSB) of the data in one of the memory and the cache in response to receiving a write command from the host, wherein the data includes a first logical unit and a second logical unit, wherein the controller is further configured to receive a protection attribute of the first logical unit from the host, wherein the controller is further configured to perform the backup operation of the first logical unit in response to the write command from the host, when the detachability attribute of the battery is a fixed type and the protection attribute of the first logical unit is enabled, and wherein the controller does not perform the backup operation of the first logical unit in response to the write command from the host, when the detachability attribute of the battery is the fixed type and the protection attribute of the first logical unit is disabled.

8. The storage device of claim 7, wherein the controller does not perform a synchronization operation of the data in response to receiving a synchronization command from the host, when the detachability attribute of the battery is the fixed type.

9. The storage device of claim 7, wherein the controller is further configured to perform a synchronization operation in response to receiving a synchronization command from the host, when the detachability attribute of the battery is a detachable type.

10. The storage device of claim 7, wherein the controller is further configured to perform the backup operation of the data in response to a write command of the host, when the detachability attribute of the battery is a detachable type.

11. The storage device of claim 7, wherein the controller is further configured to transfer a response signal to the host without performing a synchronization operation in response to receiving a synchronization command from the host, when the detachability attribute of the battery is the fixed type.

12. The storage device of claim 7, wherein, when the detachability attribute of the battery is the fixed type, the controller is further configured to record the data in the cache in response to receiving a cache write command from the host, and wherein the controller is further configured to perform a synchronization operation, and initialize a storage space of the cache, when the storage space of the cache is full.

13. A data processing system, comprising:

a host;

a storage device comprising:

a memory configured to store data received from the host, a cache configured to temporarily store the data, and a controller configured to control the cache; and a battery which supplies power to the host and the storage device, wherein the controller is further configured to:

receive a detachability attribute of the battery from the host, the detachability attribute indicating whether the battery is physically detachable from the data processing system, receive a charging operation state attribute indicating a charging operation state of the battery from the host, and determine, based on the detachability attribute and the charging operation state attribute, whether to perform hibernation in response to receiving a hibernation enter request from the host, wherein the data includes a first logical unit and a second logical unit, wherein the controller is further configured to receive a protection attribute of the first logical unit from the host, wherein the controller is further configured to perform the backup operation of the first logical unit in response to the write command from the host, when the detachability attribute of the battery is a fixed type and the protection attribute of the first logical unit is enabled, and wherein the controller does not perform the backup operation of the first logical unit in response to the write command from the host, when the detachability attribute of the battery is the fixed type and the protection attribute of the first logical unit is disabled.

14. The data processing system of claim 13, wherein the controller does not perform the hibernation in response to receiving the hibernation enter request from the host when the charging operation state attribute indicates that the battery is charging.

15. The data processing system of claim 14, wherein the memory includes a NAND flash memory, and wherein the controller is further configured to perform a background operation for operating the NAND flash memory without a time limitation in a state where the hibernation is not performed, when the charging operation state attribute indicates that the battery is charging.

16. The data processing system of claim 13, wherein the controller is further configured to perform the hibernation in response to receiving the hibernation enter request from the host when the charging operation state attribute indicates that the battery is not charging.

17. The data processing system of claim 16, wherein the memory includes a NAND flash memory, and wherein the controller is further configured to perform a background operation for operating the NAND flash memory only for a predetermined time, when the charging operation state attribute indicates that the battery is not charging.

* * * * *